(12) United States Patent
Choi et al.

(10) Patent No.: US 7,957,294 B2
(45) Date of Patent: Jun. 7, 2011

(54) PCI EXPRESS PACKET FILTER INCLUDING DESCRAMBLER

(75) Inventors: Yong-Seok Choi, Daejon (KR);
Seong-Woon Kim, Daejon (KR);
Myung-Joon Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 311 days.

(21) Appl. No.: 11/633,046

(22) Filed: Dec. 1, 2006

(65) Prior Publication Data
US 2007/0127486 A1    Jun. 7, 2007

(30) Foreign Application Priority Data

Dec. 1, 2005 (KR) .................. 10-2005-0116138
Jun. 30, 2006 (KR) .................. 10-2006-0061386

(51) Int. Cl.
*H04L 12/26* (2006.01)
*H04J 3/16* (2006.01)
*G06F 13/12* (2006.01)
*G06F 13/20* (2006.01)
*H04L 29/06* (2006.01)

(52) U.S. Cl. .......... 370/241; 370/469; 710/71; 710/313; 713/153

(58) Field of Classification Search .................. 370/392, 370/241, 469; 710/71, 313; 713/153
See application file for complete search history.

(56) References Cited

U.S. PATENT DOCUMENTS

| | | | |
|---|---|---|---|
| 7,111,122 B2 * | 9/2006 | Noro et al. | 711/117 |
| 2006/0115087 A1 | 6/2006 | Takeuchi | |
| 2006/0117125 A1 * | 6/2006 | Tseng | 710/301 |
| 2006/0123139 A1 * | 6/2006 | Iyer et al. | 710/2 |

FOREIGN PATENT DOCUMENTS

KR    1020040031908    4/2004

* cited by examiner

*Primary Examiner* — Alpus H Hsu
*Assistant Examiner* — Saad Hassan
(74) *Attorney, Agent, or Firm* — Ladas & Parry LLP

(57) ABSTRACT

A packet detecting device used in a receiver employing PCI Express protocol is disclosed. The packet detecting device includes: a physical layer packet detecting unit for detecting a physical layer packet from a PCI express packet received and parallelized to 16 bit data through a physical deserializer; a descrambling unit for descrambling a physical layer packet from a PCI express packet received and parallelized to 16 bit data through a physical deserializer; a data link layer packet detecting unit for detecting a data link layer packet from a descrambled packet outputted from the descrambling unit; and a transaction layer packet detecting unit for detecting a transaction layer packet from a descrambled packet outputted from the descrambling unit.

3 Claims, 4 Drawing Sheets

PCI EXPRESS PACKET FILTER INCLUDING DESCRAMBLER

FIELD OF THE INVENTION

The present invention relates to a packet detecting device used in a receiver employing a peripheral component interconnect express (PCI Express) 1x protocol that is an input/output (IO) standard.

DESCRIPTION OF RELATED ARTS

Peripheral component interconnect express (PCI Express) is a layered protocol, consisting of a transaction layer, a data link layer, and a physical layer. Packets are processed at a layer different from those processed at other layers in types and formats.

In a PCI Express protocol, a control character and a data character formed in a byte unit of 8 bits, are transformed to data formed in a symbol unit, and the transformed data is transmitted using 2.5 Gbps of high frequency. In the high frequency transmission, energy is concentrated at a predetermined frequency due to radiation pattern. It generates electromagnetic interference (EMI) noise. In order to prevent the EMI noise from being generated, a scrambling scheme is used. Therefore, it requires a packet detection device to have a descrambling function.

The data bandwidth for 2.5 Gbps signal can be designed as 8 bits at 250 MHz of data transfer speed. Since a circuit with a low speed device is generally designed as 125 MHz of data transfer speed, the data bandwidth of 2.5 Gbps is required to be 16 bits. However, the PCI Express standard introduces a descrambling method for only 8 bits parallel processing. Therefore, it requires the data bandwidth to be extended for 16 bits parallel processing.

Since a simple scrambler is used in the conventional technology, a storing buffer is required to previously inspect a packet to process unscrambled packets used in a physical layer. Since the packets are doubly processed at the physical layer, the overlapping problem of the related circuits is arisen.

SUMMARY OF THE INVENTION

It is, therefore, an object of the present invention to provide a PCI express packet detection device for detecting packets at each layer by equipping a descrambling function in a packet receiver in a PCI express protocol.

In accordance with an aspect of the present invention, there is provided a PCI express packet detection device including: a physical layer packet detecting unit for detecting a physical layer packet from a PCI express packet received and parallelized to 16 bit data through a physical deserializer; a descrambling unit for descrambling a physical layer packet from a PCI express packet received and parallelized to 16 bit data through a physical deserializer; a data link layer packet detecting unit for detecting a data link layer packet from a descrambled packet outputted from the descrambling unit; and a transaction layer packet detecting unit for detecting a transaction layer packet from a descrambled packet outputted from the descrambling unit.

BRIEF DESCRIPTION OF THE DRAWINGS

The above and other objects and features of the present invention will become better understood with regard to the following description of the preferred embodiments given in conjunction with the accompanying drawings, in which.

DETAILED DESCRIPTION OF THE INVENTION

Hereinafter, a PCI Express packet filter having a descrambler will be described in more detail with reference to the accompanying drawings.

Figure 1:
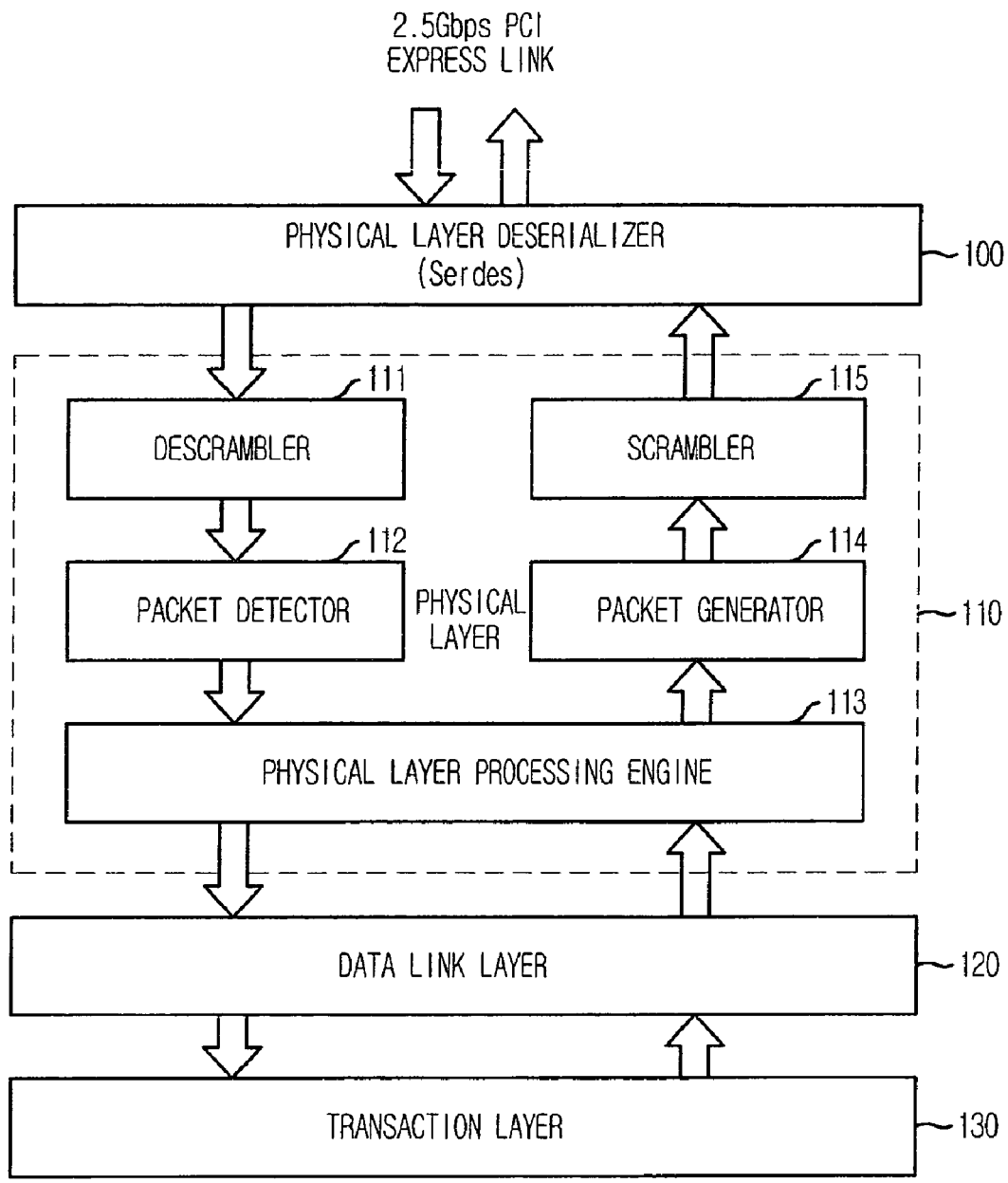
FIG. 1 is a block diagram illustrating a PCI Express standard, which is used in PCI Express specification or general design.

FIG. 1 is a block diagram illustrating a PCI Express standard according to related art, which is used in PCI Express specification or general design.

The PCI Express standard includes a physical layer deserializer 100, a physical layer 110, a data link layer 120, and a transaction layer 130. The physical layer 110 includes a descrambler 111, a packet detector 112, a physical layer processing engine 113, a packet generator 114 and a scrambler 115.

The physical layer deserializer 100 receives serial data, parallelizes the received serial data to 16-bit parallel data, and outputs the 16-bit parallel data to the descrambler 111. The descrambler 111 descrambles the 16-bit parallel data and outputs the descrambled data to the physical layer processing engine 113 through the packet detector 112. The physical layer processing engine 113 substitutes the scrambled data with a detection signal if the scrambled packet is used in the physical layer engine. Otherwise, the physical layer processing engine 113 passes the scrambled packets to the data link layer 120.

The data link layer 120 receives not only a packet processed in the data link layer 120 but also a packet processed in the transaction layer 130. The data link layer processed the related packets and transfers the packet to be processed in the transaction link layer 130 to the transaction link layer 130.

Figure 2:
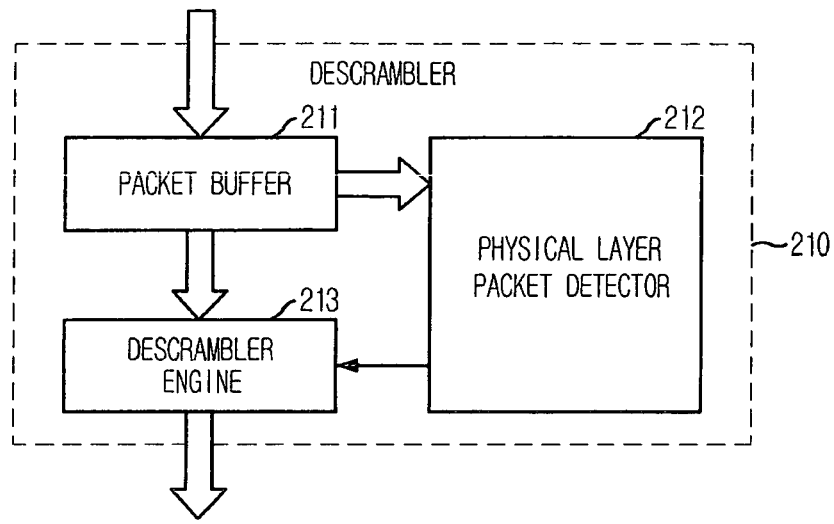
FIG. 2 is a diagram illustrating a descrambler 210 according to the related art shown in FIG. 1.

FIG. 2 is a diagram illustrating a descrambler 210 according to the related art shown in FIG. 1.

Referring to FIG. 2, the descrambler 210 according to the related art includes a packet buffer 211, a physical layer packet detector 212, and a descrambler engine 213.

The descrambler 210 requires an additional packet buffer 211 for detecting a physical layer packet which is not scrambled, thereby generating a delay time. The descrambler 210 also requires the physical layer packet detector 212 for determining whether the packet stored in the packet buffer 211 is a physical layer packet or not.

A PCI express packet receiver receives 2.5 Gbps serial input signal to a 16-bit parallel signal using a deserializer.

An object of the present invention is to extract packets used in each layer of the PCI express from the 16 bit parallel data. Since a physical layer packet is not scrambled, the physical layer packet is not required to pass through the descrambler 210 when packets are detected.

A packet transmitter transforms 8-bit packets to 10 bit symbols and transmits the 10 bit symbols. A received signal is not always sorted in 16-bit units. Therefore, it requires a circuit to detect not only packets arranged in 16-bit units but also packets not arranged in 16-bit units.

Since the data link layer packet and the transaction layer packet are transmitted as scrambled format, a descrambler is required. Also, the conventional circuit requires the received data to be extended to 8 bits, to detect packet regardless of whether it is arranged or not, and to output a packet arranged in 16-bit units at a final output end.

Figure 3:
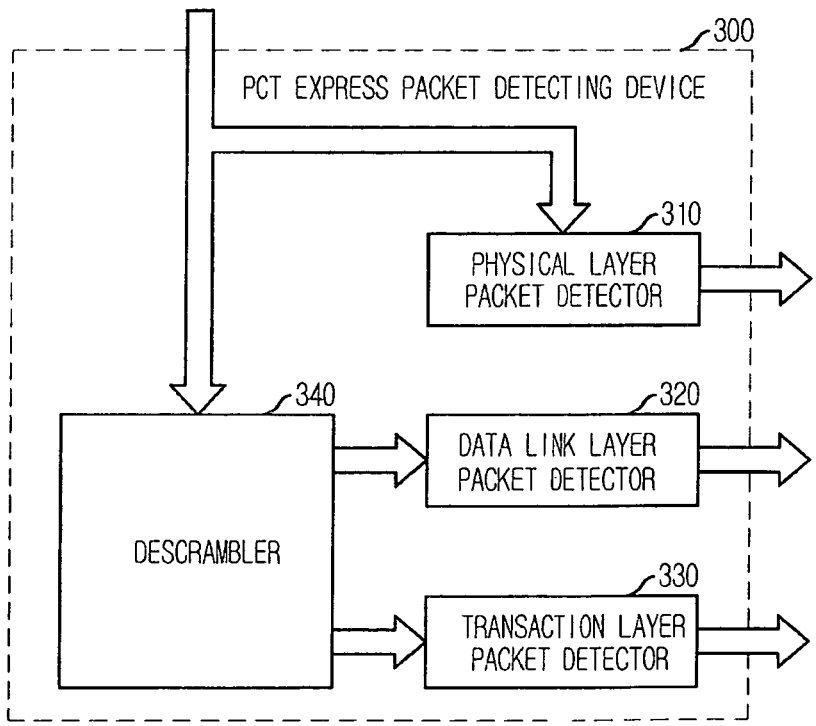
FIG. 3 is a block diagram illustrating a PCI express packet detection device in accordance with an embodiment of the present invention.

FIG. 3 is a block diagram illustrating a PCI express packet detection device in accordance with an embodiment of the present invention.

Referring to FIG. 3, the PCI express packet detection device according to the present embodiment includes a physical layer packet detector 310, a data link layer packet detector 320, a transaction layer packet detector 330, and a descrambler 340. The physical layer packet detector 310 detects a physical layer packet from a PCI express packet which is received and parallelized to 16 bits data through the physical deserializer 100. The descrambler 340 descrambles a PCI express packet which is received and parallelized to 16 bits data through the physical deserializer 100. The data link layer packet detector 320 detects data link layer packet from the described packet outputted from the descrambler 340. The transaction layer packet detector 330 detects a transaction layer packet layer packet from the described packet outputted from the descrambler 340.

Since the physical packet is not a scrambled packet, the physical packet detector 310 directly receives a signal from the deserializer 100, not from the descrambler 340. The descrambler 340 descrambles all of the received packets without determining whether the received packet is the physical layer packet or not. Therefore, the descrambler 340 does not require the packet buffer 211 and the physical layer packet detector 212 as shown in FIG. 2. The scrambler 340 can be embodied with including only a descrambler engine 213.

Figure 4:
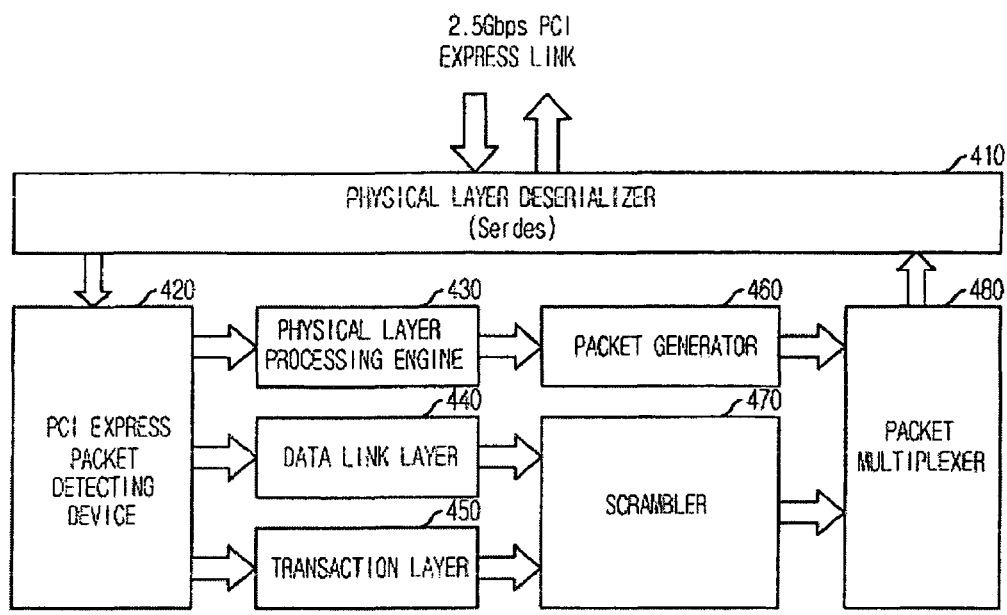
FIG. 4 is a block diagram illustrating a method of embodying a PCI express packet detection device according to an embodiment of the present invention in a PCI express engine.

FIG. 4 is a block diagram illustrating a method of embodying a PCI express packet detection device according to an embodiment of the present invention in a PCI express engine.

Referring to FIG. 4, since the PCI express packet detection device according to the present embodiment classifies packets into physical layer packets to be processed at the physical layer processing engine 430, data link layer packets to be processed at the data link layer 440, and transaction layer packets to be processed at the transaction layer 450, each layer can be independently designed. If such a structure is applied to a packet transmitting side, a physical layer processing engine 430 can transmit a packet without scrambling the packet using the scrambler 470. A data link layer 440 and a transaction layer 450 scramble the packet through the scrambler 470 and transmit the scrambled packet. Therefore, the scrambler 470 also does not require the physical link packet determiner 212 and the packet buffer 211 shown in FIG. 2.

Instead of having the physical link packet determiner 212 and the packet buffer 211, the scrambler 470 requires a packet multiplexer 480. However, it is not a complicated circuit because an order of generating a packet at each layer is defined in the PCI express protocol.

Since a scrambling algorithm is basically equal to a descrambling algorithm, the descrambler 210 in FIG. 2 can be used as the scrambler 470 in FIG. 4.

Figure 5:
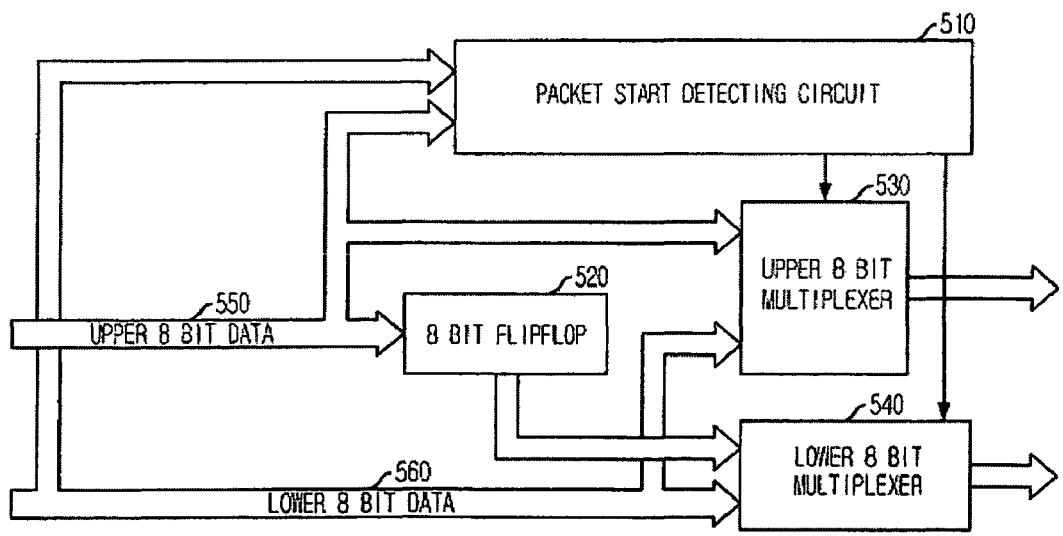
FIG. 5 is a block diagram illustrating a physical layer packet detector in a PCI express packet detection device in accordance with an embodiment of the present invention.

FIG. 5 is a block diagram illustrating a physical layer packet detector in a PCI express packet detection device 420 in accordance with an embodiment of the present invention. That is, FIG. 5 shows a circuit for arranging packets used in the physical layer packet detector 310.

The physical layer packet detector 310 has an identical structure compared to the data link layer packet detector 320 and the transaction layer packet detector 330 excepting a packet start detection circuit 510.

If a packet start is detected from a lower 8 bit data 560, the packet start detection circuit 510 outputs a control signal to an upper 8-bit multiplexer 530 to output an upper 8-bit data 555 and a lower 8 bit multiplexer 540 to output a lower 8-bit data 560. If a packet start is detected from the upper 8-bit data 560, the packet start detection circuit 510 outputs a control signal to an upper 8-bit multiplexer 530 to output the lower 8-bit data 555 and the lower 8-bit multiplexer 540 to output an output signal from a 8-bit flip-flop 520. Therefore, data outputted as the lower 8-bit always denotes the start of a corresponding packet.

Figure 6:
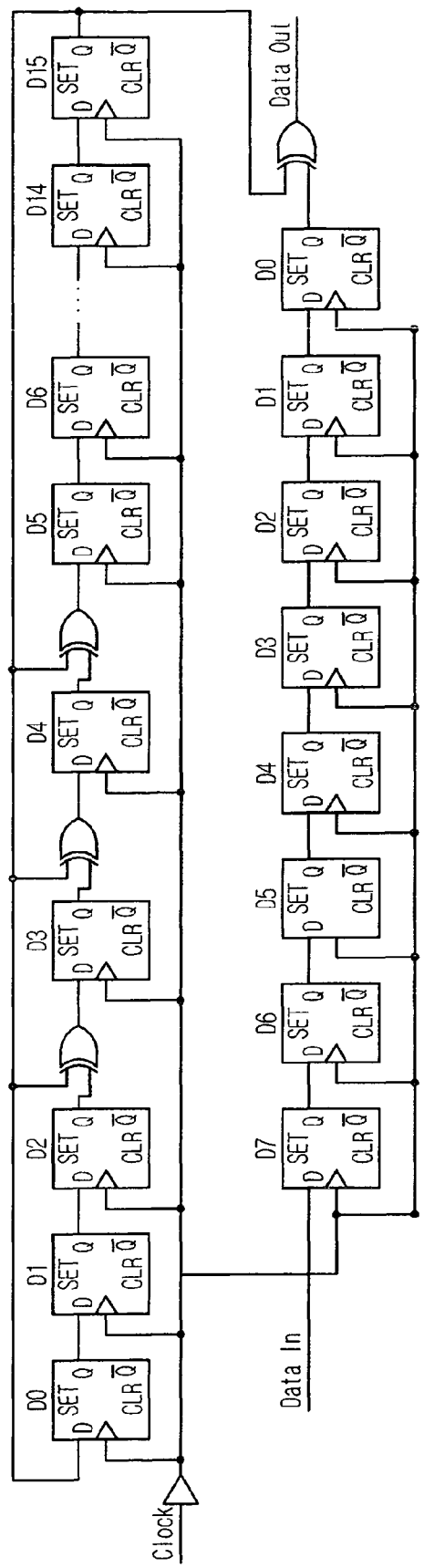
FIG. 6 is a circuit diagram illustrating a scrambler shown in FIG. 4.

A polynomial expression of a linear feedback shift register (LFSR) of a PCI express scrambler is shown in Eq. 1, and FIG. 6 shows a circuit for scrambling in a bit unit.

$$G(X)=X^{16}+X^{5}+X^{4}+X^{3}+1 \qquad \text{Eq. 1}$$

FIG. 6 is a circuit diagram illustrating a scrambler shown in FIG. 4. That is, FIG. 6 shows a LFSR calculated in a bit unit and a scrambled output data.

As shown in FIG. 6, registers D0 to D15 denote LFSR, and registers D7 to D0 denotes the scrambled data.

The LFSR has FFFF as an initial value, and the LFSR changes by feed-backing the value thereof in response to a data clock cycle.

When a COM symbol is inputted to the LFSR, the value thereof is initialized to FFFF, and when a SKP symbol is inputted to the LFSR, a feedback function and a shift function of the LFSR are interrupted.

Since the bit unit computation is operated at 2 GHz, that is, 1 bit×2 GHz=2 Gps, a 8-bit computation requires a 250 MHz operation speed because 8 bit×250 MHz=2 Gbps. Also, a 16-bit computation requires a 125 MHz operation speed because 16 bit×125 MHz=2 Gps. A symbol is 10-bit data transformed from 8-bit data, a 8 bit design is proper. However, it is difficult to operate a low speed device at 250 MHz. Therefore, in the present embodiment, a circuit operated at 125 MHz is designed.

Since the symbol is originally a 8-bit unit, the symbol is not guaranteed to be arranged in 16 bit unit. Therefore, it requires a circuit to be designed to accurately output a LFSR and a data output value not only for a unarranged symbol but also for an arranged symbol.

In the present embodiment, LFSR calculating equations are composed with all combinations in COM, general data symbol (sym), and SKP as follows.

When {SKP, COM}, {COM, SKP}, {COM, Sym}, {COM, COM} are inputted: LFSR is initialized as FFFF When {SYM, SKP}, {SKP, SYM} are inputted,

LFSR[0]=LFSR[8];

LFSR[1]=LFSR[9];

LFSR[2]=LFSR[10];

LFSR[3]=LFSR[11]⊕LFSR[8];

LFSR[4]=LFSR[12]⊕LFSR[9]⊕LFSR[8];

LFSR[5]=LFSR[13]⊕LFSR[10]⊕LFSR[9]⊕LFSR[8];

LFSR[6]=LFSR[14]⊕LFSR[11]⊕LFSR[10]⊕LFSR[9];

LFSR[7]=LFSR[15]⊕LFSR[12]⊕LFSR[11]⊕LFSR[10];

LFSR[8]=LFSR[0]⊕LFSR[13]⊕LFSR[12]⊕LFSR[11];

LFSR[9]=LFSR[1]⊕LFSR[14]⊕LFSR[13]⊕LFSR[12];

LFSR[10]=LFSR[2]⊕LFSR[15]⊕LFSR[14]⊕LFSR[13];

LFSR[11]=LFSR[3]⊕LFSR[15]⊕LFSR[14];

LFSR[12]=LFSR[4]⊕LFSR[15];

LFSR[13]=LFSR[5];

LFSR[14]=LFSR[6]; and

LFSR[15]=LFSR[7].

When {Sym, Sym} is inputted,

LFSR[0]=LFSR[0]⊕LFSR[13]⊕LFSR[12]⊕LFSR[11];

LFSR[1]=LFSR[1]⊕LFSR[14]⊕LFSR[13]⊕LFSR[12];

LFSR[2]=LFSR[2]⊕LFSR[15]⊕LFSR[14]⊕LFSR[13];

LFSR[3]=LFSR[3]⊕LFSR[15]⊕LFSR[14]⊕LFSR[0]⊕LFSR[13]⊕LFSR[12]⊕LFSR[11];

LFSR[5]=LFSR[5]⊕LFSR[2]⊕LFSR[15]⊕LFSR[14]⊕LFSR[13]⊕LFSR[1]⊕LFSR[14]⊕LFSR[13]⊕LFSR[12]⊕LFSR[0]⊕LFSR[13]⊕LFSR[12]⊕LFSR[11];

LFSR[6]=LFSR[6]⊕LFSR[3]⊕LFSR[15]⊕LFSR[14]⊕LFSR[2]⊕LFSR[15]⊕LFSR[14]⊕LFSR[13]⊕LFSR[1]⊕LFSR[14]⊕LFSR[13]⊕LFSR[12];

LFSR[7]=LFSR[7]⊕LFSR[4]⊕LFSR[15]⊕LFSR[3]⊕LFSR[15]⊕LFSR[14]⊕LFSR[2]⊕LFSR[15]⊕LFSR[14]⊕LFSR[13];

LFSR[8]=LFSR[8]⊕LFSR[5]⊕LFSR[4]⊕LFSR[15]⊕LFSR[3]⊕LFSR[15]⊕LFSR[14];

LFSR[9]=LFSR[9]⊕LFSR[6]⊕LFSR[5]⊕LFSR[4]⊕LFSR[15];

LFSR[10]=LFSR[10]⊕LFSR[7]⊕LFSR[6]⊕LFSR[5];

LFSR[11]=LFSR[11]⊕LFSR[8]⊕LFSR[7]⊕LFSR[6];

LFSR[12]=LFSR[12]⊕LFSR[9]⊕LFSR[8]⊕LFSR[7];

LFSR[13]=LFSR[13]⊕LFSR[10]⊕LFSR[9]⊕LFSR[8];

LFSR[14]LFSR[14]⊕LFSR[11]⊕LFSR[10]⊕LFSR[9];

and

LFSR[15]=LFSR[15]⊕LFSR[12]⊕LFSR[11]⊕LFSR[10].

The lower 8 bits among data output values are output as it is if the lower 8 bit of the input data is a control character. If the lower 8 bit of the input data is a data character, the lower 8 bits are outputted as follows.

output data[0]=input data[0]⊕LFSR[15];

output data[1]=input data[1]⊕LFSR[14];

output data[2]=input data[2]⊕LFSR[13];

output data[3]=input data[3]⊕LFSR[12];

output data[4]=input data[4]⊕LFSR[11];

output data[5]=input data[5]⊕LFSR[10];

output data[6]=input data[6]⊕LFSR[9];

output data[7]=input data[7]⊕LFSR[8];

The upper 8 bits among the data output value are outputted as it is if the upper 8 bit data is a control character.

When {Sym, COM} is inputted, output data[8]=not input data[9];

output data[9]=not input data[10];

output data[10]=not input data[11];

output data[11]=not input data[12];

output data[12]=not input data[13];

output data[13]=not input data[14];

output data[14]=not input data[15]; and output data[15]=not input data[16].

When {Sym, SKP} is inputted, output data[8]=input data[9]⊕LFSR[15];

output data[9]=input data[10]⊕LFSR[14];

output data[10]=input data[11]⊕LFSR[13];

output data[11]=input data[12]⊕LFSR[12];

output data[12]=input data[13]⊕LFSR[11];

output data[13]=input data[14]⊕LFSR[10];

output data[14]=input data[15]⊕LFSR[9]; and output data[15]=input data[16]⊕LFSR[8].

When {Sym, Sym} is inputted, output data[8]=input data[9]⊕LFSR[7];

output data[9]=input data[10]⊕LFSR[6];

output data[10]=input data[11]⊕LFSR[5];

output data[11]=input data[12]⊕LFSR[4]⊕LFSR[15];

output data[12]=input data[13]⊕LFSR[3]⊕LFSR[15]⊕LFSR[14];

output data[13]=input data[14]⊕LFSR[2]⊕LFSR[15]⊕LFSR[14]⊕LFSR[13];

output data[14]=input data[15]⊕LFSR[1]⊕LFSR[14]⊕LFSR[13]⊕LFSR[12]; and output data[15]=input data[16]⊕LFSR[0]⊕LFSR[13]
⊕LFSR[12]⊕LFSR[11].

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

According to the present invention, packets are classified and distributed by layers in the PCI express protocol, thereby reducing unnecessary uses of buffers. Also, 2.5 Gbps can be embodied at 125 MHz operation speed using a 16 bit descrambler which can be used in a low speed device. The packet detection device according to the present invention outputs data with data sorted using a sorter included inside thereof. Thus, an additional sorter is not required. Furthermore, the packets are not doubly inspected in the present invention, thereby reducing the waste of circuit.

The present application contains subject matter related to Korean patent application Nos. 2005-0116138 and 2006-0061386, filed with the Korean patent office on Dec. 1, 2005, and Jun. 30, 2006, respectively, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. A peripheral component interconnect express (PCI express) packet detection device, the device comprising:
    a receiving unit for receiving at least one of each of a scrambled and unscrambled PCI express packet,
    wherein the receiving unit detects the respective type of received PCI express packet as being either a scrambled PCI express packet or an unscrambled PCI express packet,
    wherein the receiving unit receives the PCI express packet as serial data and parallelizes the received serial data to 16-bit parallel data using a physical deserializer,
    wherein the receiving unit outputs the 16-bit parallel data,
    wherein the receiving unit outputs the received unscrambled PCI express packet directly to a physical layer detecting unit and outputs the scrambled PCI express packet directly to a descrambling unit,
    wherein the physical layer packet detecting unit is configured to receive the unscrambled PCI express packet as a physical layer packet and output the physical layer packet,
    wherein the descrambling unit is configured to receive the scrambled PCI express packet and then outputs a descrambled packet to either a data link layer packet detecting unit or a transaction layer detection unit,
    wherein the data link layer packet detecting unit is configured to receive the data link layer packet from the descrambling unit as a descrambled packet,
    wherein the transaction layer packet detecting unit is configured to receive the transaction layer packet from the descrambling unit as a descrambled packet, and
    wherein the PCI express packet detection device is configured to output the unscrambled physical layer packet without having the descrambling unit detecting whether the respective type of received PCI express packet is a physical layer packet.

2. The PCI express packet detection device as recited in claim 1, wherein the physical layer packet detecting unit includes a packet start detection circuit that outputs a control signal to an upper 8-bit multiplexer to output an upper 8-bit data and a lower 8-bit multiplexer to output a lower 8-bit data if a packet start is detected from a lower 8-bit data, and outputs a control signal to an upper 8-bit multiplexer to output the lower 8-bit data and the lower 8-bit multiplexer to output an output signal from a 8-bit flip-flop if a packet start is detected from the upper 8-bit data.

3. The PCI express packet detection device as recited in claim 1, wherein the descrambling unit is used as a scrambler, and performs 1-bit calculations in a 16-bit unit by classifying calculation of a linear feedback shift register.

* * * * *